United States Patent Office 3,316,757
Patented May 2, 1967

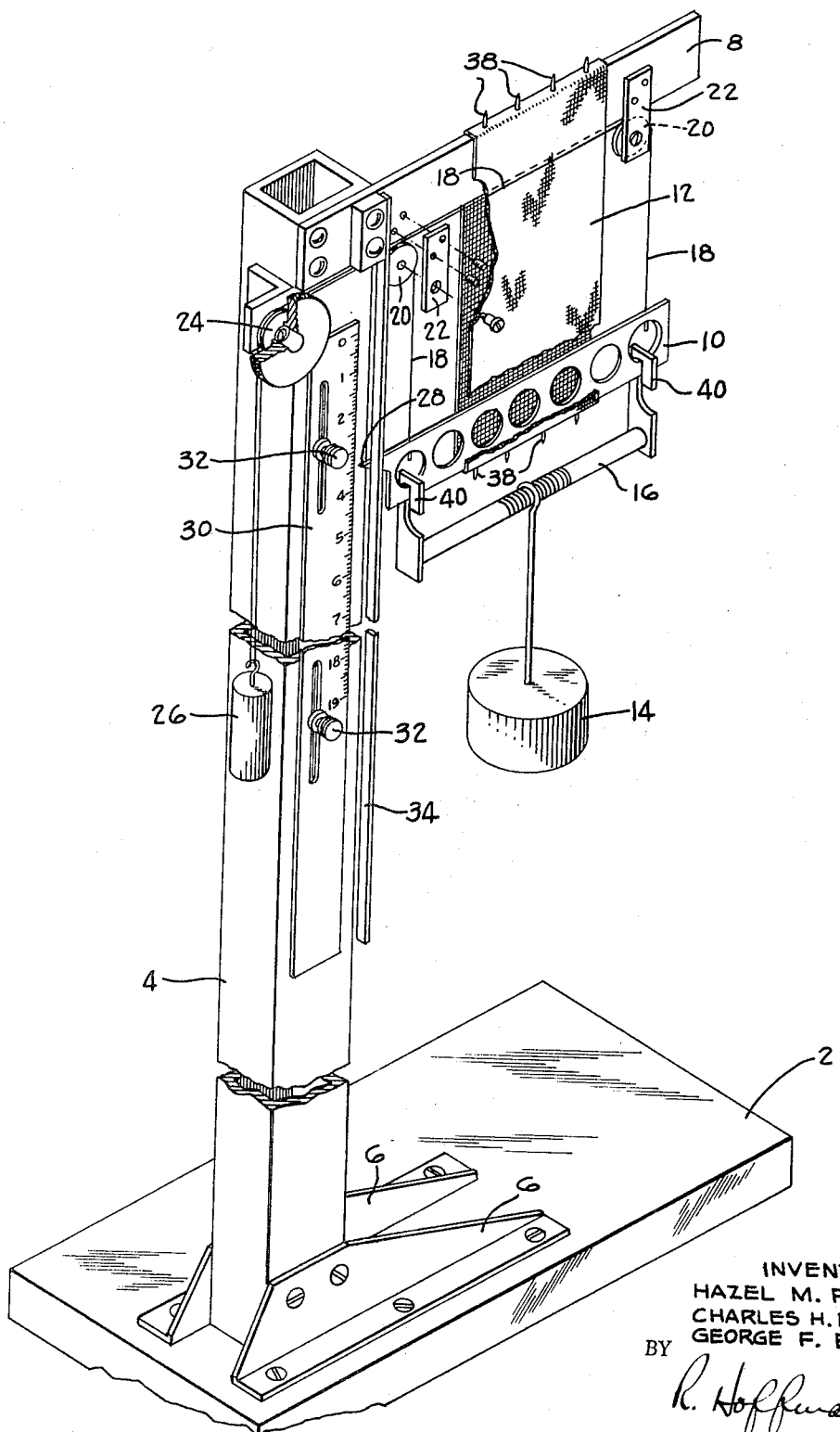

3,316,757
FABRIC STRETCH-RECOVERY TEST APPARATUS
Hazel M. Fletcher, Hyattsville, Charles H. Fischbach, Baltimore, and George F. Button, Lanham, Md., assignors to the United States of America as represented by the Secretary of Agriculture
Filed June 22, 1965, Ser. No. 466,136
1 Claim. (Cl. 73—89)

A non-exclusive, irrevocable, royalty-free license in the invention herein described, throughout the world for all purposes of the United States Government, with the power to grant sublicenses for such purposes, is hereby granted to the Government of the United States of America.

This invention relates to a device for evaluating properties of textile fabrics. More particularly the invention relates to an instrument for testing the elasticity and elastic recovery of knit fabrics.

A convenient method of obtaining reliable, meaningful information of the stress behavior of knit fabrics is needed. Instrumentation has heretofore been more concerned with factors such as tensile strength and durability than with elastic recovery of the fabric. Methods currently available for evaluating stress behavior of knit fabrics are limited in their application, and test methods have not been standardized.

An object of the present invention is to provide an instrument for measuring elasticity and elastic recovery of knit fabrics.

Another object is to provide a device that is easy to use, both in regard to operation and to rapidity of obtaining data.

A further object is to provide an easy to use instrument which will furnish meaningful data for comparing some physical properties of knit fabrics. Other objects and advantages of the invention will be apparent from the following description with reference to the attached drawing, a perspective view of the device with test loop of fabric in place, but part of loop cut away to show details of supporting arms.

In general, according to the present invention, the device comprises a base, a support arising vertically therefrom, fabric securing means comprising a fixed and a movable arm, the fixed arm, adapted to hold a loop of fabric without slippage, being rigidly secured at one end to the support and extending in a direction perpendicular to the support, the movable arm, also adapted to prevent slippage of the loop of fabric, being adjustably suspended proximate each of its ends from the fixed arm from bearing means proximate the ends of the fixed arm, weights for establishing a load on the movable arm, a load carrying bar adapted at its ends to reversibly engage the movable arm and adapted for positioning of the load intermediate the ends, preferably near the midpoint, of the bar, a counterbalance, two flexible lines, each line connecting one of the ends of the movable arm to the counterbalance, substantially frictionless fulcrum means attached to the support in substantially the same plane as the bearing means on the fixed arm, the flexible lines proceeding from the counterbalance over the fulcrum means and over the bearing means to the ends of the movable bar and being adjusted to suspend the movable arm in a plane parallel to the fixed arm, scale means adjustably mounted on the support, and indicator means integral with the movable arm, adapted to secure reading from the scale.

Referring to the drawing, the instrument is typically constructed to be conveniently portable with a base 2 sufficiently large for stability during use. Alternatively, the vertical support 4 can be rigidly secured, as by brackets 6, to a bench or table top for a more permanent installation. The fixed arm 8 extends perpendicularly from the support 2. Since extension of the support above the top of the fixed arm is unnecessary, the fixed arm is typically secured by one end to the support at or near the top of the support, but the height of the support and location of the arm on the support may be varied considerably if desired. The fixed arm 8 must have enough height, however, to permit movable arm 10 to be raised and lowered within limits of stretchability of loop of fabric 12 as activated by addition or removal of weight load 14 to load carrying bar 16 which is adapted proximate its ends to reversibly engage the movable arm 10.

Movable arm 10 is suspended on flexible lines 18, from wheel pulleys 22 mounted with ball bearings (not shown) on pulley brackets 22, or any other bearing means which provides negligible resistance to movement of the lines. Nylon fish line was used, but other flexible lines may be substituted. The two lines proceed over a common fulcrum 24, another ball bearing-mounted pulley with double grooves, one for each line, and attached to counterbalance 26. The lines are adjusted so that movable bar 10 is suspended in a plane parallel to the horizontal fixed bar 8. The movable bar is adapted at the end nearest the support to provide indicator means 28 for securing readings from scale 30 which is adjustably attached to support 4 by fasteners 32. The guide rail 34 for keeping the indicator and movable arm steady is considered optional to the construction and use of the device.

The loop of fabric 12 is prevented from slipping along the arms 8 and 10 by pins 38 on the outer edges of the arms, although other means of holding the loop in place may be used.

The loop is prepared by cutting a rectangular specimen of the knit fabric to give a strip of predetermined size, and the two ends are sewed in a plain seam to form a loop of fabric of a predetermined circumference. In practice, the specimens were 4 inches wide and approximately 11 inches long, and were sewed to form a loop with exactly 10 inches circumference. In evaluating fabrics, specimens are cut lengthwise of the bolt of fabric and also widthwise of the fabric.

The device constructed for evaluating loops of knit fabric of the above-described dimensions had a fixed arm which extended 10 inches from the support, the movable arm was 9 inches long, the support was 45 inches high, 2¼ inches wide and 1¾ inches deep, and the base was 18 x 12 inches. The device can obviously be constructed of various metal or non-metal materials, but for ease of carrying, machinability of parts, etc., most parts were made from aluminum stock and mounted on a wooden base.

In operating the instrument the load bar 16, if in place, is detached from movable arm 10. The loop of fabric is slipped over the horizontal fixed arm 8, with the seam at the top, and the movable arm 10 is put into the loop and adjusted so that the suspending lines 18 and loop 36 are in approximately vertical alignment. The load bar 16 is attached to the movable arm, in this instance by hooks 40 secured to the ends of the load bar and adapted to be inserted in openings cut in the movable arm. At this time the weight of the movable arm 10 and the load bar 16 should be substantially in equilibrium with the counterbalance 26. The counterbalancing of the movable arm and load bar is a significant feature in obtaining accurate measurements, especially that of the elastic recovery.

A nominal load (10 to 20 grams) is applied to straighten the fabric for setting the indicator at zero, and for reading the unrecoverable elongation. The scale 30 is adjusted so that indicator 28 is at zero. The nominal load is removed and a load of one pound applied. The elongation reading is taken from the scale 30 seconds after the load is applied. The load is removed, the nominal load reapplied and, after a pause of uniform duration, such as 30 seconds, the unrecoverable elongation reading taken. The procedure is repeated with loads of 3, 5, 10 and 25 pounds. Elastic recovery is calculated as the ratio of recoverable elongation to total elongation, expressed in percent.

Measurements of elongation and unrecoverable elongation have been made with the present device on a variety of knit fabrics; fabrics such as cotton, wool, nylon, acetate and viscose rayon, and of plain, rib, and tricot knit fabrics. The data obtained can be compared directly or can be graphed to give curves which permit ready visual comparison of properties.

Results obtained with this manually operated device were compared with data obtained for the same knit fabrics employing an electronic tensile tester set at predetermined loads for one series of tests and at predetermined extensions in another series of tests. The electronic tensile tester was an Instron (Model T.M., Instron Engineering Corp., Quincy, Mass.), which produces stress-strain curves. Recoverable and total elongations were measured from the stress-strain curves.

In graphs prepared by plotting percent of elastic recovery vs. percent elongation, the curves for the data from the present device and from the electronic tensile tester set at predetermined extensions were quite similar; and, while data were not identical, ranking of the fabrics according to elastic recovery by these two methods was comparable. Statistical analysis indicated that both of these methods were satisfactory for measuring the elastic recovery of knit fabrics; the third method, using the electronic tester set at predetermined loads, provided less consistent data.

Thus, the device of the present invention has been demonstrated to be satisfactory for measuring elastic recovery of knit fabrics and for the ranking of knit fabrics for this property.

We claim:

A device for measuring the elastic recovery of a loop of knit fabric comprising a base, a support arising vertically from, and secured to, said base, fabric securing means comprising a fixed arm and a movable arm, said fixed arm rigidly secured at one end to said support, said fixed arm extending in a direction perpendicular to said support and adapted to hold said loop without slippage along said arm, said movable arm suspended proximate each of its ends from said fixed arm, means proximate the ends of said fixed arm for adjustably supporting said movable arm, means of preventing substantial slippage of said loop along said movable arm, weights for establishing a load on said movable arm, a load carrying bar adapted at its ends to reversibly engage said movable arm and adapted for positioning of the load intermediate the ends of said bar, a counterbalance, two flexible lines, each of said lines connecting one of the ends of the movable arm to said counterbalance, substantially frictionless pulley means attached to said support in substantially the same plane as the said means on said fixed arm, the flexible lines proceeding from the counterbalance over said pulley means and over said means to the ends of said movable bar and being adjusted to suspend said movable arm in a plane parallel to said fixed arm, scale means adjustably mounted on said support, and indicator means, integral with said movable arm, adapted to secure readings from said scale.

References Cited by the Examiner

UNITED STATES PATENTS

| 1,499,546 | 7/1924 | Oxley | 73—160 X |
| 2,066,311 | 1/1937 | Appel et al. | 73—89 |
| 2,154,561 | 4/1939 | Breer et al. | 73—88 |
| 2,187,914 | 1/1940 | Reitan | 73—95 |

RICHARD C. QUEISSER, *Primary Examiner.*

J. H. WILLIAMSON, *Assistant Examiner.*